United States Patent [19]

Davis

[11] Patent Number: 4,976,823
[45] Date of Patent: Dec. 11, 1990

[54] SUPPORT RING WITH ADDITIONAL VOID SPACE

[75] Inventor: John S. Davis, Lake Jackson, Tex.

[73] Assignee: BASF Corporation, Wyandotte, Mich.

[21] Appl. No.: 211,997

[22] Filed: Jun. 27, 1988

[51] Int. Cl.$^5$ .............................................. B01D 3/14
[52] U.S. Cl. ................... 202/158; 202/266; 261/114.5
[58] Field of Search ............. 202/158, 239, 266; 261/96, 97, 114.1, 114.5

[56] References Cited

U.S. PATENT DOCUMENTS

| | | | |
|---|---|---|---|
| 87,029 | 2/1869 | Dayton | 52/116 |
| 480,842 | 8/1892 | Feldmann | 202/158 |
| 546,018 | 9/1895 | Lofhjelm | 202/84 |
| 885,303 | 4/1908 | Woodall et al. | 188/60 |
| 1,427,426 | 8/1922 | Wild | 202/121 |
| 1,989,459 | 1/1935 | Parker | 202/114 |
| 2,344,269 | 3/1944 | Saco, Jr. | 122/491 |
| 2,565,355 | 8/1951 | Cook | 261/114.5 |
| 2,575,186 | 11/1951 | Ryant, Jr. | 202/266 |
| 3,208,833 | 9/1965 | Carson | 261/96 |
| 3,871,969 | 3/1975 | Chapman | 202/158 |
| 4,028,443 | 6/1977 | Livingston et al. | 202/158 |
| 4,031,173 | 6/1977 | Rogers | 261/DIG. 11 |
| 4,133,852 | 1/1979 | DiNicolantonio et al. | 261/114.5 |
| 4,174,363 | 11/1979 | Bruckert | 261/114.5 |
| 4,333,893 | 6/1982 | Clyde | 261/94 |
| 4,345,972 | 8/1982 | Hannebaum et al. | 202/83 |
| 4,623,493 | 11/1986 | Bentham | 202/158 |
| 4,698,138 | 10/1987 | Silvey | 202/158 |
| 4,744,929 | 5/1988 | Robinson et al. | 261/97 |
| 4,801,306 | 1/1989 | Denbleyker | 261/112.1 |

OTHER PUBLICATIONS

Rogets International Thesaurus, 3rd ed., 104, p. 127.

*Primary Examiner*—Virginia Manoharan
*Attorney, Agent, or Firm*—William G. Conger; Bruce E. Harang; Karen M. Dellerman

[57] ABSTRACT

A generally open support ring is mounted onto the internal surface of a distillation tower. The support ring includes a seat rim and a plurality of mechanical elements which secure the seat rim to the internal surface of the tower. The plurality of mechanical elements are attached to both the inner surface and the seat rim. Each mechanical element protrudes from the inner surface and is spaced apart from the other mechanical elements. The plurality of mechanical elements enable the seat rim to be mounted along a substantially horizontal plane around the internal surface of the tower. The support ring is adapted to support an open container of liquid thereon in such a manner that vapor below the support ring is in fluid communication with vapor above the support ring through a series of vent openings in the support ring.

2 Claims, 1 Drawing Sheet

U.S. Patent   Dec. 11, 1990   4,976,823
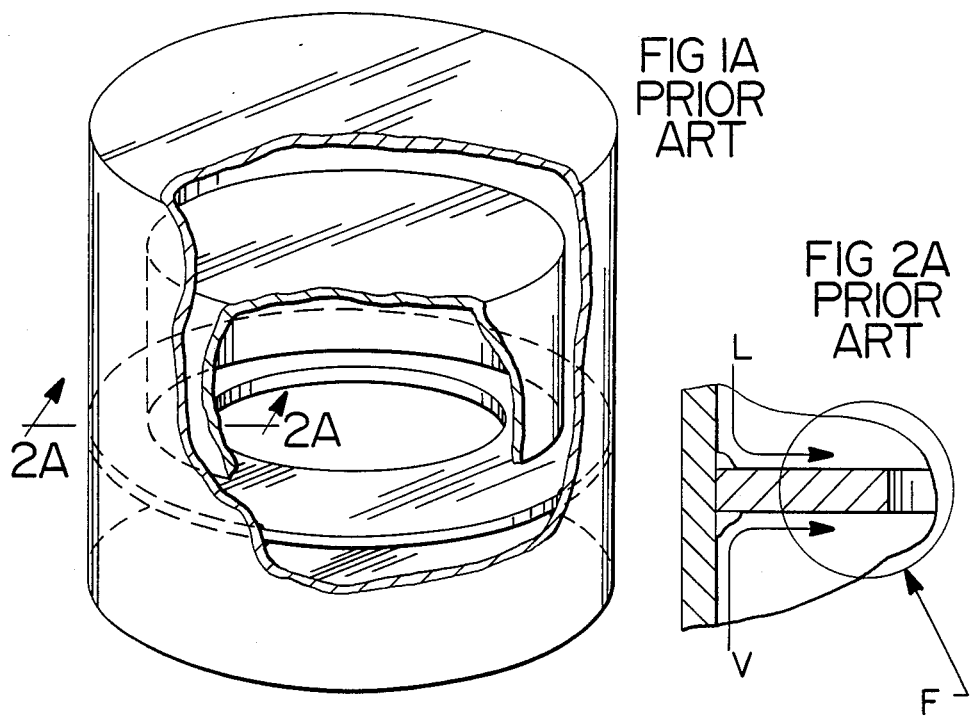
FIG 1A PRIOR ART
FIG 2A PRIOR ART
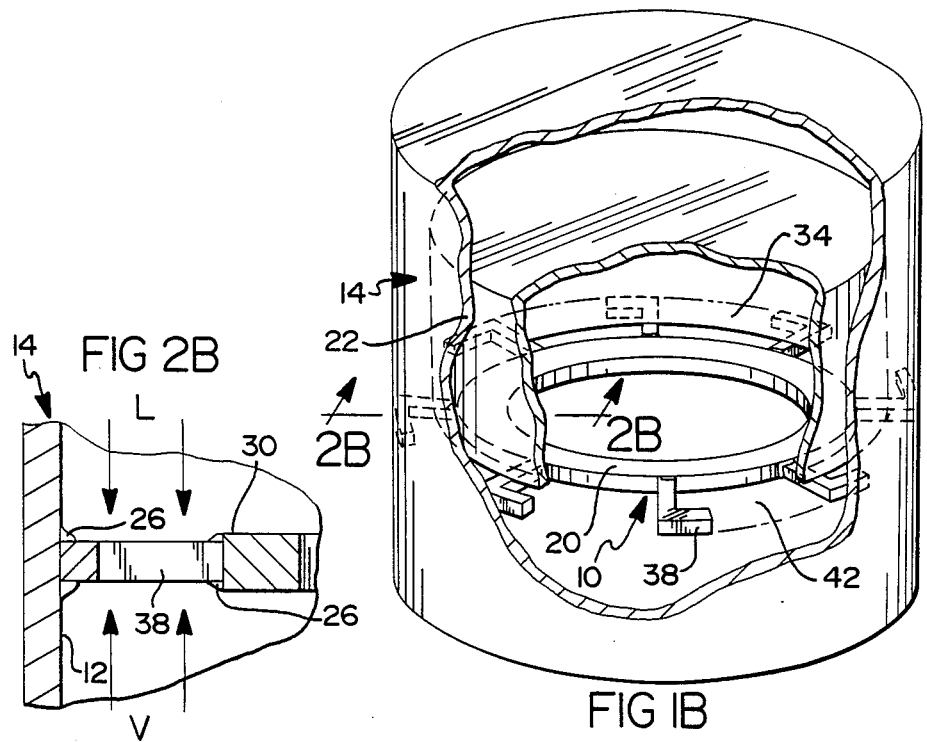
FIG 2B
FIG 1B

SUPPORT RING WITH ADDITIONAL VOID SPACE

BACKGROUND OF THE INVENTION

1. Field of the invention

The present invention relates to a new structure relating to small diameter atmospheric and vacuum distillation towers, and more particularly, to load-bearing structure within the tower.

2. Background Art

The internal structure of a distillation tower is attached and supported to the tower using a support ring. The support rings are used to seat packing structure, support grids, and hold down grids within the distillation tower.

The packing portion of the distillation tower generally includes a collection of tower packing materials which provide efficient contact between the liquid and the vapor. The packing generally occupies a relatively small volume, so that there is free space to permit a large throughput of vapor. The capacity of a tower is limited by several factors, involving void space and available tower diameter.

Small diameter distillation towers experience "flooding" at high capacities as calculated by using the inside tower diameter. Flooding occurs in the packing when the vapor bumps the liquid up and out of the packing sections. Such localized flooding is depicted in FIG. 2A wherein arrow L represents liquid flow, arrow V represents vapor flow, and F represents a region of localized flooding. Most of the flooding in these smaller distillation towers occurs in the immediate vicinity of the packing at the conventional support ring (see FIG. 2A). Increasing the void space at the support ring for a small diameter tower improves the column capacity and efficiency of the packed tower.

Conventional support rings in distillation towers are secured to the internal surface of the towers, and are used to support packing, hold-down grids, and other similar type loads (see FIG. 1A).

The conventional support ring is about three inches wide and is secured within the internal diameter of the tower. Typically, the ring consumes six inches of the inside diameter of the distillation tower. Hence, in smaller towers where the internal tower diameter is three feet or less, the size of the support ring represents a significant portion of the internal cross-sectional area of the tower.

The internal diameter of the tower is used for purposes of calculating the capacity and the efficiency of the tower. If, for example, the inside of the tower has a 2.50 foot diameter, the total cross-sectional area of the tower is about 4.91 square feet. If the tower uses a conventional three-inch support ring, the cross-sectional area of the tower is reduced to 3.14 square feet, or a reduction of about 35%. Hence, as demonstrated by this example, a two-and-a-half foot tower with the conventional support ring is equivalent to a two foot tower without the support ring.

What is needed is a new support ring apparatus for smaller distillation towers which has the load-bearing strength of the conventional support ring, but which does not cause the dramatic reduction in the cross-sectional area of the tower.

SUMMARY OF THE INVENTION

The principle advantage of the support ring in smaller diameter towers is to improve tower capacity and efficiency, by providing more void space to prevent localized flooding at the support ring. The new support ring may improve by as much as 80 to 90 percent the void space over a conventional support ring, the exact improvement depending upon the internal spacing between the various elements of the new support ring.

The generally open support ring of the present invention is mounted onto the internal surface of the distillation tower. The support ring is not only capable of supporting large vertical loads, but is also capable of enabling vapor disposed below the support ring to be in fluid communication with vapor disposed above the support ring.

The support means of the support ring include a seat rim and means for securing the seat rim to the internal surface of the tower. The securing means consists of a series of elements disposed between the inner surface and the seat rim. Each element protrudes from the inner surface and is spaced apart from the other elements. The securing means enables the seat rim to be mounted along a substantially horizontal plane around the internal surface of the tower.

The support ring is adapted to support an open container of liquid thereon. A series of vent openings in the ring enable vapor below the support ring to be in fluid communication with vapor above the support ring as is shown in FIG. 2B where arrow L represents liquid flow and arrow V represents vapor flow.

For a more complete understanding of the support ring of the present invention, reference is made to the following detailed description and accompanying drawings in which the presently preferred embodiment of the invention is illustrated by way of example. It is expressly understood, however, that the drawings are for purposes of illustration and description only, and are not intended as a definition of the limits of the invention. Throughout the following description and drawings, identical reference numbers refer to the same component throughout the several views.

BRIEF DESCRIPTION OF THE DRAWINGS

FIG. 1A is a simplified perspective view of a conventional support ring shown mounted within a distillation tower;

FIG. 1B is a simplified perspective view of the support ring of the preferred embodiment of the present invention shown mounted within a distillation tower;

FIG. 2A is an enlarged cross-sectional view of the conventional support ring of FIG. 1A taken along Section 2A—2A, depicting the general direction of the liquid and vapor flow and the location of the localized flooding; and FIG. 2B is an enlarged cross-sectional view of the support ring of the present invention of FIG. 1B taken along Section 2B—2B, depicting the general direction of the liquid and vapor flow.

DETAILED DESCRIPTION OF THE INVENTION

Referring now to the drawings, FIG. 1A and FIG. 1B depict simplified distillation towers with a conventional support ring shown in FIG. 1A, and the support ring of the present invention shown in FIG. 1B. Similarly, FIG. 2A and FIG. 2B depict enlarged cross-sections taken from FIG. 1A and FIG. 2A, respectively.

The support ring of the present invention 10 is specifically designed for small diameter atmospheric and vacuum distillation towers 14. Such towers are typically used to separate hydrocarbons having molecular weights ranging between 85 to 130.

A generally open support ring of the present invention 10 is depicted in FIG. 1B mounted onto the internal surface 12 of the distillation tower 14. The support ring 10 is not only capable of supporting large vertical loads, but is also capable of enabling vapor disposed below the support ring 10 to be in fluid communication with vapor or liquid disposed above the support ring 10. The support ring 10 consists of a seat rim 20 which is preferably hollow, and means 22 for securing the seat rim 20 to the internal surface of the tower 12.

The support ring 10 includes means 30 for supporting a vertical load within the distillation tower 14, and means 34 for enabling vapor disposed below the support ring 10 to be in fluid communication with vapor disposed above the support ring 10. The support means 30 comprises a series of elements 38 preferably disposed radially between the seat rim 20 and the internal surface of the tower 12. The elements may be beams having any of a variety of cross sections, including but not limited to I, C, H, or L shaped beams. L-shaped beams are preferred, and for a 3 inch support ring, the size of the L-shaped beam will be $3'' \times 3'' \times 3'' \times \frac{1}{4}''$. The elements 38 are attached to both the internal surface 12 and the seat rim 20, preferably by a multiplicity of welds 26. Each element 38 protrudes from the internal surface 12 and is spaced apart from the other elements 38. The securing means 22 enables the seat rim 20 to be mounted along a substantially horizontal plane around the internal surface of the tower 12. The support ring 10 is adapted to support an open container of liquid thereon.

The enabling means 34 includes a series of vent openings 42 within the support ring 10, so that vapor disposed below the support ring 10 is in fluid communication with vapor disposed above the support ring 10.

The mechanical strength of the support ring 10 ca be varied as required, and may be designed to be equivalent to the conventional support ring by the selection of the materials used, by increasing the vertical width of the seat rim 20 and the elements 38, by varying the shape and number of elements 38, by varying the spacing between the elements 38, and by varying the type of weld (or other suitable union) between the elements 38 and the internal surface 12 and between the elements 38 and the seat rim 20.

While the support ring apparatus has been described in conjunction with a specific embodiment, it is evident that many alternatives, modifications, and variations will be apparent to those skilled in the art in light of the disclosure herein. It is intended that all such alternatives, modifications, and variations are included herein that fall within the spirit and scope of the appended claims.

What is claimed is:

1. A support ring apparatus for supporting a load internal to a distillation tower, the distillation tower having an internal surface, the apparatus comprising:
    (a) a support structure being disposed inside the internal surface of the distillation tower along a substantially horizontal plane, a vertical load being supportable and retainable upon the support structure, said support structure being a seat rim having a hollow central portion;
    (b) a series of mechanical elements separating the seat rim from the internal surface of the distillation tower the series of mechanical elements being securely attachable to the seat rim and to the internal surface of the distillation tower, the mechanical elements being spaced apart from each other; and
    (c) a multiplicity of vent openings being disposed between the series of mechanical elements, the vent openings enabling vapor disposed below the seat rim to be in fluid communication with vapor disposed above the seat rim, wherein the mechanical strength of the support ring apparatus is adjustable by varying the shape of the mechanical elements, by varying the number of mechanical elements, and by varying the spacing between the mechanical elements such that a support ring with improved void space is provided and localized flooding of said support ring is substantially avoided.

2. The apparatus of claim 1, wherein each of the series of mechanical elements protrudes radially outwardly from the internal surface and is spaced apart from the other elements thereby enabling the fluid communication of the vapor.

* * * * *